United States Patent
Zafar et al.

(10) Patent No.: US 12,221,545 B2
(45) Date of Patent: Feb. 11, 2025

(54) LIQUID LIGNIN COMPOSITION COMPRISING LIGNIN, WATER, ALKALI AND UREA

(71) Applicant: Stora Enso OYJ, Helsinki (FI)

(72) Inventors: Ashar Zafar, Älta (SE); Jesper Ekström, Johanneshov (SE); Dimitri Areskogh, Bromma (SE)

(73) Assignee: Stora Enso OYJ, Helsinki (FI)

( * ) Notice: Subject to any disclaimer, the term of this patent is extended or adjusted under 35 U.S.C. 154(b) by 412 days.

(21) Appl. No.: 16/631,236

(22) PCT Filed: Jul. 2, 2018

(86) PCT No.: PCT/IB2018/054901
§ 371 (c)(1),
(2) Date: Jan. 15, 2020

(87) PCT Pub. No.: WO2019/016636
PCT Pub. Date: Jan. 24, 2019

(65) Prior Publication Data
US 2020/0216672 A1    Jul. 9, 2020

(30) Foreign Application Priority Data
Jul. 18, 2017  (SE) .................................. 1750944-9

(51) Int. Cl.
*C08L 97/00* (2006.01)
*B27N 3/00* (2006.01)

(52) U.S. Cl.
CPC ............ *C08L 97/005* (2013.01); *B27N 3/002* (2013.01)

(58) Field of Classification Search
CPC .................................................. C08L 97/005
See application file for complete search history.

(56) References Cited

U.S. PATENT DOCUMENTS

| 4,303,562 | A | 12/1981 | Hollis, Jr. et al. | |
| 6,326,461 | B1* | 12/2001 | Giroux | C08L 61/24 |
| | | | | 530/200 |
| 2003/0045665 | A1* | 3/2003 | Sudan | C08L 61/06 |
| | | | | 527/300 |
| 2011/0245381 | A1* | 10/2011 | Winterowd | C08L 61/06 |
| | | | | 524/14 |
| 2014/0296429 | A1* | 10/2014 | Winterowd | C09J 161/06 |
| | | | | 524/596 |
| 2016/0257791 | A1* | 9/2016 | Pietarinen | C07G 1/00 |
| 2016/0304757 | A1* | 10/2016 | Feng | C09J 161/12 |
| 2018/0273755 | A1* | 9/2018 | Cobb | C08L 97/005 |
| 2019/0152094 | A1* | 5/2019 | Zafar | C09D 7/70 |
| 2020/0157287 | A1* | 5/2020 | Nasli Bakir | C08G 8/38 |

FOREIGN PATENT DOCUMENTS

| CN | 1850933 | A | 10/2006 |
| CN | 106883800 | A | 6/2017 |
| DE | 3509712 | A1 | 10/1986 |
| RU | 2162860 | C2 | 2/2001 |
| WO | 2016157141 | A1 | 10/2016 |
| WO | 2016165023 | A1 | 10/2016 |
| WO | 2017006215 | A1 | 1/2017 |

OTHER PUBLICATIONS

Zhu, H et al. "Technical soda lignin dissolved in urea as an environmental friendly binder in wood fiberboard" In: Journal of Adhesion Science and Technology, 2014, vol. 28, No. 5, pp. 490-498; whole document.
Adrian Celsi, International Search Report for Application No. PCT/IB2018/054901, dated Oct. 10, 2018.
Liu, Gang-Yong, et al., Study on Viscosity of Lignin in Phenol Formaldehyde Adhesive, Fine Chemicals, vol. 26, No. 4, Apr. 2009, pp. 400-402.
Jingyu Wang et al., Dissolution of lignin in green urea aqueous solution, Applied Surface Science 425 (2017), 736-741.

* cited by examiner

*Primary Examiner* — Liam J Heincer
(74) *Attorney, Agent, or Firm* — Greer, Burns & Crain, Ltd.

(57) ABSTRACT

The present invention relates to a liquid lignin composition, particularly useful in the manufacture of resins for products such as insulation, laminates and engineered wood products such as oriented strand boards (OSB). The liquid lignin composition has a low viscosity even at low water content.

14 Claims, No Drawings

LIQUID LIGNIN COMPOSITION COMPRISING LIGNIN, WATER, ALKALI AND UREA

This application is a U.S. National Phase under 35 U.S.C. § 371 of International Application No. PCT/IB2018/054901, filed Jul. 2, 2018, which claims priority under 35 U.S.C. §§ 119 and 365 to Swedish Application No. 1750944-9, filed Jul. 18, 2017.

FIELD OF THE INVENTION

The present invention relates to a liquid lignin composition, particularly useful in the manufacture of resins for products such as insulation, laminates and wood products such as plywood, oriented strand boards (OSB), particle boards and fiberboards. The liquid lignin composition has a low viscosity even at low water content.

BACKGROUND

Lignin, an aromatic polymer is a major constituent in e.g. wood, being the most abundant carbon source on Earth second only to cellulose. In recent years, with development and commercialization of technologies to extract lignin in a highly purified, solid and particularized form from the pulp-making process, it has attracted significant attention as a possible renewable substitute to primarily aromatic chemical precursors currently sourced from the petrochemical industry.

Lignin, being a polyaromatic network has been extensively investigated as a suitable substitute for phenol during production of phenol-formaldehyde adhesives. These are used during manufacturing of structural wood products such as plywood, oriented strand board and fiberboard. During synthesis of such adhesives, phenol, partially replaced by lignin, is reacted with formaldehyde in the presence of either basic or acidic catalyst to form a highly cross-linked aromatic resins termed novolacs (when utilizing acidic catalysts) or resoles (when utilizing basic catalysts).

Phenolic resins are presently used in for example wood panels, e.g. plywood, OSB (oriented strand board) etc. Lignin is a suitable aromatic replacement of phenol in phenolic resin due to price volatility of fossil based phenol. Lignin is utilized as powder at the time that it is incorporated into the LPF formulation. Lignin can also be utilized in liquid form in alkali solution in order to avoid lignin dust. If the moisture content of the powder lignin is relatively low (0-5%), it can be dusty and may create respiratory hazards. If the moisture content of the solids is relatively high (8-50%), it can be sticky or clumpy and difficult to transfer in reliable and quantitative manner. One solution to avoid this problem is adding lignin in liquid form in a liquid lignin composition which is an alkali solution.

Native lignin is a high-molecular-weight phenylpropane polymer that is present in wood at a level of about 24-35% in softwood and 17-25% in hardwood. Native lignin in wood is not soluble in water and one of its functions in the plant is to bond the cellulose fibers (wood cells) together. In the commercial kraft pulping process wood chips are steeped in aqueous solutions of sodium sulfide and sodium hydroxide at elevated temperatures in order to degrade the native lignin to the point of being soluble in water. This allows for isolation of the high-value wood fibers.

The residual aqueous solution of lignin, sodium carbonate and sodium sulfate is commonly referred to as "black liquor". Usually, the black liquor also contains various carbohydrates. Conventional black liquor has a pH value of about 13-14. The lignin present in black liquor can be isolated in discreet fractions by addition of acids to lower the pH value. As the pH level is decreased, there is initial precipitation of the highest molecular weight lignin compounds. These can be separated from the residual liquor by filtration. A further reduction in the pH value results in precipitation of more lignin compounds, which have lower molecular weight than the first fraction. This second set of precipitated compounds can also be isolated by filtration. This process can be conducted multiple times to yield an array of fractions.

Acids suitable for this process include strong acids such as sulfuric acid, nitric acid, and hydrochloric acid; or weak acids such as acetic acid or carbonic acid. The latter is achieved by injecting carbon dioxide into the black liquor.

US2014/0296429 is directed to liquid lignin compositions containing water in the amount of about 60-95% by weight.

A major problem concerning the use of liquid lignin compositions is that the viscosity of the liquid lignin composition becomes too high if the lignin amount is above 25 wt-% and the water amount in the lignin composition is below 60 wt % (depending on the alkali content). For resins for certain applications, the solid content of the resin is quite high, e.g. the resins for laminate applications has a solid content up to 60% and the resins for fiberboards has a solid content up to 65%. The viscosity of the resins for certain applications is also much lower, e.g. the resins for laminates have viscosity range 40-100 cP. In order to use a liquid lignin composition for resins for those applications, the water content and the viscosity of the liquid lignin compositions need to be minimized.

There is thus a need for a liquid lignin composition that contains a high amount of lignin, yet with a sufficiently low viscosity and a reduced amount of water.

SUMMARY OF THE INVENTION

It has now surprisingly been found that it is possible to prepare a liquid lignin composition with a high amount of lignin, yet with a sufficiently low viscosity and a reduced amount of water. It was found that the water content and viscosity of the lignin can be reduced by adding 1-30% urea to the lignin alkaline solution. Thus, the amount of water in the liquid lignin composition can be decreased by the addition of urea without significantly affecting the viscosity. This liquid lignin composition can be used to cook the resins for laminates, insulation and wood products by avoiding the problem of adding too high water content from the liquid lignin composition.

Preferably the lignin is an alkaline lignin generated in e.g. the Kraft process. The lignin may then be separated from the black liquor by using the process disclosed in WO2006031175. In one embodiment of the invention, the lignin used is produced by the "LignoBoost" process.

The present invention is thus directed to a liquid lignin composition comprising 20-60% wt-% water, 20-40 wt-% lignin, 0.5-11 wt % of a group 1 alkali metal hydroxide and 1-30 wt-% urea.

The liquid lignin composition can be used in the manufacture of resins. The present invention also relates to the use of the resin composition in engineered wood products such as plywood, particle board, wafer board, gluelam beams, structural composite lumber, oriented strand board (OSB), oriented strand lumber (OSL), laminated veneer lumber (LVL) and other applications such as laminates, insulation and molding compounds.

The present invention is also directed to products such as insulation, laminates and engineered wood products such as plywood, oriented strand boards (OSB) manufactured using said resins prepared based on the liquid lignin composition according to the present invention.

DETAILED DESCRIPTION

The present invention is directed to a liquid lignin composition comprising 20-60% wt-% water, 20-40 wt-% lignin, 0.5-11 wt-% of a group 1 alkali metal hydroxide and 1-30 wt-% urea.

Preferably, the composition comprises 25-55 wt-% water, such as 30-50 wt-% or more preferably 35-45 wt-% water.

Preferably, the composition comprises 20-40 wt-% lignin, such as 25-40 wt % lignin, 26-40 wt-% lignin, more preferably 30-40 wt-% lignin, most preferably 25-35 wt-% lignin.

Preferably, the composition comprises 1-30 wt-% urea, preferably 5-25 wt-% urea, more preferably 5-20 wt %, most preferably 5-15 wt %.

Preferably, the composition comprises 0.5-10 wt-% alkali, preferably 4-8 wt-% of a group 1 alkali metal hydroxide.

Examples of group 1 alkaline metal hydroxides suitable for this invention include sodium hydroxide, potassium hydroxide, lithium hydroxide, rubidium hydroxide, cesium hydroxide, and francium hydroxide.

The liquid lignin composition can be prepared by the steps of mixing lignin, water, alkali and urea in any order, optionally heating the mixture, such as heating the mixture at a temperature of from 30° C. to 95° C., such as from 60° C. to 80° C. The heating, if applied, may have a duration of from 1 minute to about 3 hours. The liquid lignin composition may then be allowed to cool and used in further process steps.

The liquid lignin composition may for example be used to prepare a resin. The liquid lignin composition is then mixed with additional components such as phenol, optionally formaldehyde and optionally alkali and a resin is prepared according to methods known in the art. Typically, such a resin is prepared by mixing the liquid lignin composition according to the present invention with the additional components at a temperature of from 20° C. to 95° C. for a suitable period of time, such as from 15 minutes to 48 hours. The additional components can optionally be pre-mixed prior to being mixed with the liquid lignin composition according to the present invention.

The resins can be used to manufacture products such as insulation, laminates and engineered wood products such as plywood, oriented strand boards (OSB).

It is intended throughout the present description that the expression "lignin" embraces any kind of lignin, e.g. lignin originated from hardwood, softwood or annular plants. In one embodiment, the lignin is a kraft liquor degraded lignin. Preferably the lignin is an alkaline lignin generated in e.g. the Kraft process. The lignin may then be separated from the black liquor by using the process disclosed in WO2006031175.

The lignin can be obtained from the substance commonly known as "black liquor". The black liquor can be derived from wood chips, including those based on softwood or hardwoods. Softwoods can include pines (loblolly, lodge pole, slash, pitch, ponderosa, shortleaf, yellow, white, jack and red), fir (Douglas, Frazier, white, balsam, Pacific silver, sub alpine), cedar (Alaskan, Northern white, Eastern red, Western red, incense, Port Orford), spruce (red, white, black, englemann, Sitka), hemlock (Eastern, Western, Mountain, larch) and others. Hardwoods can include oak (white, red, bur, live), poplar (yellow, balsam, quaking aspen, big tooth), maple (sugar, silver, red), basswood, birch, alder, beech, gum, cherry, cypress, elm, hack berry, hickory, sassafras, sycamore, cucumber, walnut, locust and others.

The black liquor is formed by steeping wood chips in solutions of sodium sulfide and sodium hydroxide at elevated temperatures for a period of time and subsequent removal of the cellulosic fibers. The residual liquor is dark in color due to the presence of degraded lignin. The term 'black liquor' is a consequence of this dark color. The process used to generate the black liquor is generally known as the kraft pulping process. The lignin may then be separated from the black liquor by using the process disclosed in WO2006031175. In one embodiment, the lignin is produced using the "LignoBoost" process.

The present invention is also directed to a method for preparing a resin comprising the steps of
  a) pre-methylolation of phenol by reacting phenol with formaldehyde; followed by
  b) mixing the product of step a) with a liquid lignin composition as described herein, and heating the mixture to obtain an aqueous bonding resin.

Step a) takes place essentially in the absence of lignin.

In step a), phenol is reacted with formaldehyde. The reaction typically takes place in an aqueous phase. The formaldehyde is generally provided to the reaction in the form of formaldehyde in water. Alkali is typically added to the reaction mixture. The temperature in the step a) is from 15° C. to 95° C., such as from 20° C. to 90° C., such as from 40° C. to 85° C. The duration of the reaction in step a) depends on the reaction conditions, but is generally from 1 minute to 5 hours, such as from 15 minutes to 3 hours. The pre-methylolation in step a) may be essentially complete or partial.

In step b), the pre-methylolated phenol obtained in step a) is reacted with lignin, wherein the lignin is provided as a liquid lignin composition as describe dherein, and optionally additional phenol and optionally additional formaldehyde to form an aqueous bonding resin. One benefit of adding lignin dissolved in alkali solution according to the present invention is that it does not create any lumps in the reaction mixture since it is difficult for lignin to get dissolved at lower pH levels especially in laminate resins. If lignin is already fully dissolved in alkali solution, then the reactivity of lignin with formaldehyde can be fully utilized. The final resin will have better reactivity as compared to a resin wherein lignin is added as powder after a phenol pre-methylolation step.

In step b), all liquid lignin composition to be added to the reaction can be added at the same time. Alternatively, the liquid lignin composition may be added in portions or continuously at a determined addition rate. For example, the liquid lignin composition may be added to the reaction over a period of from 1 second to 2 hours. The liquid lignin composition may be added at a rate of 1-5% of the total amount of liquid lignin composition to be added to the reaction in step b) per minute.

The present invention also relates to the use of the aqueous bonding resin obtained in step b) in engineered wood products such as plywood, particle board, fiberboard, gluelam beams, structural composite lumber, oriented strand board (OSB), oriented strand lumber (OSL), laminated veneer lumber (LVL) and other applications such as laminates, insulation and molding compounds. The present invention is also directed to products such as insulation, laminates and engineered wood products such as plywood, oriented strand boards (OSB) manufactured using said aqueous bonding resins prepared as described above.

EXAMPLES

Example 1

To a mixture of water and an aqueous sodium hydroxide solution (concentration: 50 wt % of NaOH in water), was added kraft lignin and urea. The mixture was stirred for approximately 5 minutes in 50 ml plastics containers with a lid and subsequently heated in an oven at 55° C. for 1-21 hours. The viscosities of lignin solutions were measured at 25° C. using a Brookfield DV-II+ LV viscometer. Viscosity values are illustrated in Table 1.

TABLE 1

| Lignin [wt %] | Urea [wt %] | Aq sol NaOH, 50 wt % [wt %] | $H_2O$ | Viscosity [cP] |
| --- | --- | --- | --- | --- |
| 30 | 0 | 16 | 54 | 59 |
| 30 | 10 | 16 | 44 | 94 |
| 30 | 20 | 16 | 34 | 153 |
| 30 | 25 | 16 | 29 | 224 |
| 30 | 30 | 16 | 24 | 310 |
| 35 | 25 | 16 | 24 | 706 |

Example 2

Lignin based phenolic resin was prepared for laminate application by first pre-methylolating phenol with formaldehyde before a further reaction with lignin and urea added in a liquid form as a dissolved lignin and urea in an alkali solution.

A liquid lignin composition was prepared before resin synthesis by mixing 104.6 g of kraft lignin (solid content 96%), 225 g of water, 40 g of urea and 23.2 g of 50% sodium hydroxide solution at room temperature in a 1 liter glass reactor equipped with overhead stirrer, condenser and temperature control unit. The composition was stirred at room temperature for 90 minutes to make sure that lignin is completely dissolved in the alkaline media. The liquid lignin composition was poured out in a plastic container. Lignin-phenol-formaldehyde resin was synthesized with a phenol replacement level of 25% with lignin. The first step involves pre-methylolation of phenol with formaldehyde under alkaline conditions. In the first step, 304 g of phenol, 304.8 g of formaldehyde (52.5%), 80 g of water and 16 g of 50% alkali solution were added into a 1 liter glass reactor equipped with overhead stirrer, condenser, and temperature control unit. The temperature was increased to 85° C. The phenol methylolation reaction was continued for 60 minutes. The reaction was monitored by measuring the viscosity at 25° C. using a Brookfield DV-II+LV viscometer. The second step involves the addition of a dissolved lignin in a liquid form into the reaction mixture. In the second step, 392.8 g of the prepared liquid lignin composition was added to the reaction. The reaction was continued for further 70 minutes before cooling down to the room temperature.

The gel time of the resin was measured by adding 10 g of the resin in a glass tube with a stamper made of aluminium. The glass tube was heated at 100° C. in an oil bath. The stamper was moving up and down until the resin became gel. The time until the resin became gel was measured as gel time.

The resin was analyzed and the results of the analysis are given in Table 2.

TABLE 2

| Resin Properties | |
| --- | --- |
| S.C (%) | 54.8 |
| pH | 9.5 |
| Gel time (min) @100° C. | 44 |

Example 3

Lignin-phenol-formaldehyde resin was synthesized for laminate applications with a phenol replacement level of 25% with lignin.

In the first step, a liquid lignin composition was prepared before resin synthesis by mixing 104.5 g of kraft lignin (solid content 96%), 187.1 g of water, 22.7 g of urea, 22.7 g of methanol and 27.5 g of 50% sodium hydroxide solution at room temperature in a 1 liter glass reactor equipped with overhead stirrer, condenser and temperature control unit. The composition was stirred at 80° C. room temperature for 60 minutes to make sure that lignin is completely dissolved in the alkaline media. Then, the temperature of the liquid lignin composition was lowered to 45° C.

In the second step, 361 g of phenol and 351.5 of formaldehyde (52.5%) were added into the reaction mixture. The temperature was increased to 90° C. The reaction was continued for 65 minutes before cooling down to room temperature. The reaction was monitored by measuring the viscosity at 25° C. using a Brookfield DV-II+LV viscometer.

The resin was analyzed and the results of the analysis are given in Table 3.

TABLE 3

| Resin Properties | |
| --- | --- |
| S.C (%) | 58 |
| pH | 9.0 |
| Gel time (min) @100° C. | 52 |

In view of the above detailed description of the present invention, other modifications and variations will become apparent to those skilled in the art. However, it should be apparent that such other modifications and variations may be effected without departing from the spirit and scope of the invention.

The invention claimed is:
1. A liquid lignin composition comprising:
   20-45% wt-% water,
   30-40 wt-% lignin,
   0.5-11 wt-% of a group 1 alkali metal hydroxide, and
   1-20 wt-% urea.
2. A liquid lignin composition according to claim 1, wherein the amount of urea is 5-15 wt-%.
3. A liquid lignin composition according claim 1, wherein the lignin is essentially in dissolved form in the composition.
4. A method for preparing the liquid lignin composition as defined in claim 1, wherein lignin is mixed with water, alkali and urea.
5. A method for preparing a resin, wherein the liquid lignin composition according to claim 1 is reacted with additional components to prepare a resin.
6. A method according to claim 5, wherein the liquid lignin composition is reacted with phenol to prepare a resin.

7. A method according to claim 5, wherein the liquid lignin composition is used to prepare a resin that is essentially free from phenol and/or essentially free from formaldehyde.

8. A method according to claim 5, wherein pre-methylolation of phenol by reacting phenol with formaldehyde is carried out, followed by mixing the product of the pre-methylolation with the liquid lignin composition.

9. A resin obtainable by the method of claim 5.

10. A method according to 5, wherein the liquid lignin composition is reacted with phenol and other components to prepare a resin.

11. The liquid lignin composition according to claim 1, wherein the amount of water is between 25-45 wt-%.

12. The liquid lignin composition according to claim 1, wherein the amount of water is between 35-45 wt-%.

13. The liquid lignin composition according to claim 1, wherein the amount of lignin is between 35-40 wt-%.

14. The liquid lignin composition according to claim 1, wherein the amount of lignin is between 30-35 wt-%.

* * * * *